UNITED STATES PATENT OFFICE.

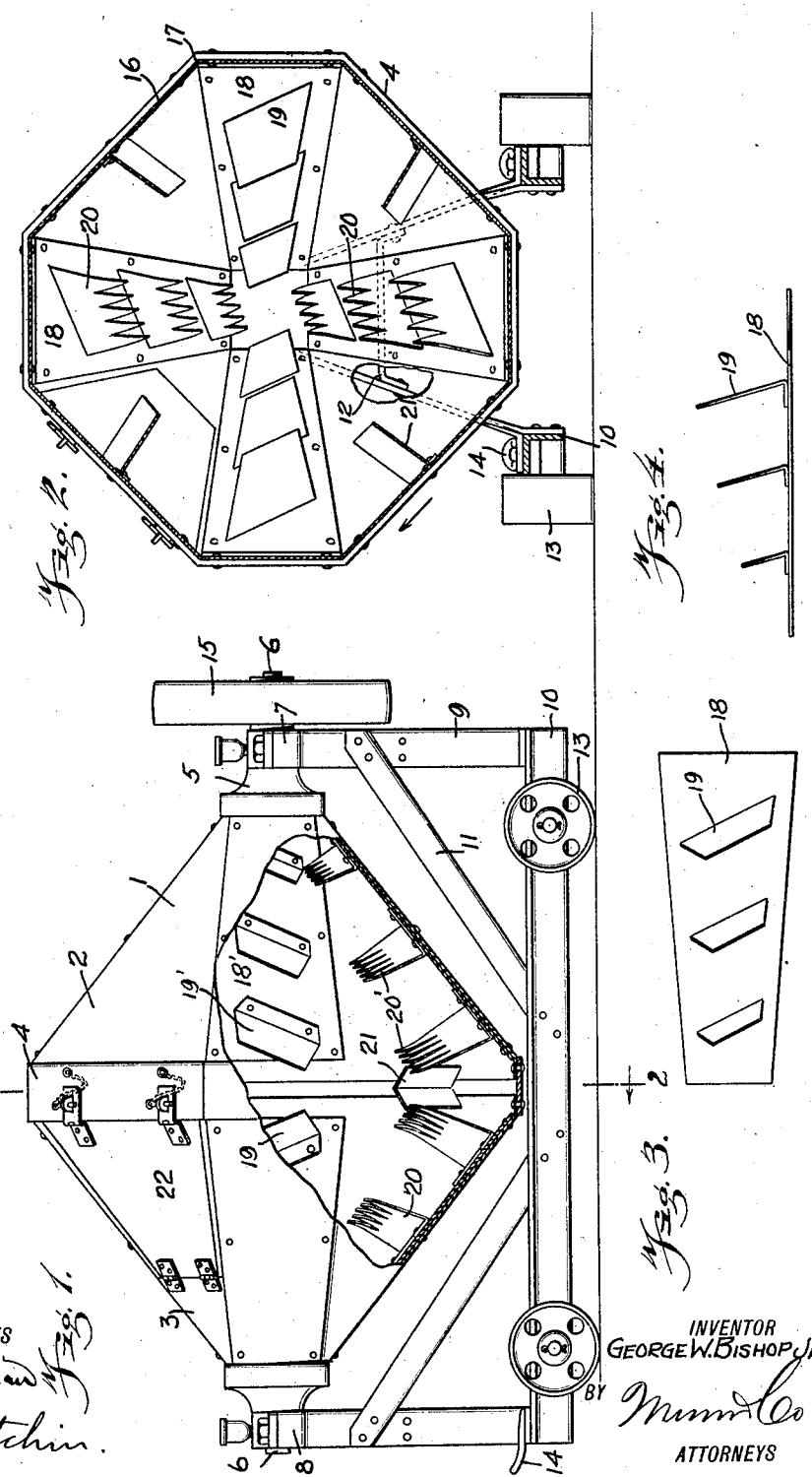

GEORGE W. BISHOP, JR., OF LYNBROOK, NEW YORK, ASSIGNOR OF ONE-THIRD TO GEORGE DE V. GILMORE, OF NEW YORK, N. Y.

MIXER.

1,395,171.   Specification of Letters Patent.   Patented Oct. 25, 1921.

Application filed May 6, 1921. Serial No. 467,499.

*To all whom it may concern:*

Be it known that I, GEORGE W. BISHOP, Jr., a citizen of the United States, and a resident of Lynbrook, in the county of Nassau and State of New York, have invented a new and Improved Mixer, of which the following is a full, clear, and exact description.

This invention relates to mixers and particularly to an improved mixer for fertilizer and has for an object to provide an improved construction wherein a thorough commingling of the fertilizer is secured in a minimum time.

Another object is to provide a mixer especially adapted for mixing commercial fertilizer wherein a plurality of different forms of stirring blades are used to break up the fertilizer as it is moved.

An additional object of the invention is to provide a fertilizer mixer which may be moved by power or manually and which is formed with an arrangement for mixing which will not interfere with the ready discharge or inlet of fertilizer at any time.

In the accompanying drawing—

Figure 1 is a side elevation of a mixer disclosing one embodiment of the invention, certain parts being broken away for illustrating the interior construction.

Fig. 2 is a section through Fig. 1 on line 2—2.

Fig. 3 is a detail plan view of the set of mixing blades embodying certain features of the invention.

Fig. 4 is a side view of the structure shown in Fig. 3.

Referring to the accompanying drawing by numerals, 1 indicates a drum formed from sheet metal or other desired material and preferably constructed in two parts, namely, parts 2 and 3, said parts being substantially in the form of cones and connected together centrally by an annular plate 4 riveted or otherwise rigidly secured thereto. At each end there is provided fittings 5 riveted or otherwise rigidly secured to the respective parts 2 and 3, said fittings 5 merging into shafts 6 extending through the respective bearings 7 and 8. These bearings are mounted on suitable uprights 9 carried by a base 10 and braced by suitable members 11. The frame 10 is also provided with transverse braces 12 whereby a rigid supporting frame structure is provided for both ends of the drum 1. Preferably, a number of traction wheels 13 are also rotatably mounted on the frame 10 so that the device may be easily moved about. Suitable hitching links 14 are connected to the frame 10 so that a horse or other power may be connected to the frame for moving the mixer from place to place. Connected to either one or both of the shafts 6 is a drive wheel 15 which is operated by a belt driven from any suitable source, as for instance, an ordinary farm tractor. If preferred, a crank can be connected with the shaft 6 either directly or through a train of gears whereby the drum 1 can be rotated manually.

The drum 1 may be made round in cross section though preferably it is made polygonal as shown in Fig. 2 so that a number of flat sides 16 will be provided, changing direction at the respective corners 17 whereby the shape of the drum will assist in breaking up and mixing the fertilizer. Interiorly of the drum 1 are arranged a number of flat wedge-shaped plates 18 riveted or otherwise rigidly secured to the drum, each of said plates carrying either a series of stirring blades 19 or a series of stirring fingers 20. Preferably, the blades 19 and 20 alternate.

As indicated in Fig. 4 the blades 19 increase in size from the end blade toward the center of the drum and are inclined at an angle to the direction of rotation whereby when the drums rotate in one direction the material being mixed will be thrown toward the center whereas if it is rotated in the opposite direction an opposite working of the material will result. Preferably, the fingers 20 are slightly longer than the blades 19 and act to finely divide and break up any particldes of fertilizer which tends to stick or form lumps. In addition to these stirring and mixing blades a number of stirring buckets 21 are riveted or otherwise secured to the drum at the center and act to raise the central mass and stir the same so that it will be forced in an opposite direction to the way the blades 19 and 20 tend to work the material. The wedge-shape plates 18 are preferable as they form a good foundation for supporting the blades though if desired the blades 19 and 20 could be riveted or otherwise secured directly to the casing. As indicated in Figure 1 the blades 19 and 19' are arranged right and left as well as the fingers 20 and 20'.

The entire construction is made from comparatively light material but by reason of the shape of the angle bars used in the frame for supporting the drum, a very strong structure is produced. The arrangement is designed to present a simple mixer for farmers' use whereby they may mix commercial fertilizer at slack times, as for instance, in the winter or on rainy days. In carrying out this idea, the farmer will buy the chemicals separately and then will place in the drum 1 measured quantities of the respective chemicals, after which, the drum is rotated until said chemicals or fertilizing elements have been thoroughly mixed and commingled, after which, the mixed fertilizer is removed through the door 22, which door may be of any desired construction. That shown in the drawing is an ordinary door having hinges at one end and a hasp at the other end with locking pins for normally holding them in a locked position. After the first batch has been discharged, a second, third and additional batches are mixed from time to time as the farmer has an opportunity. In this way when the time arrives for using the fertilizer a sufficient quantity has been mixed.

What I claim is:—

1. In a mixer for fertilizer a casing adapted to receive fertilizer chemicals, a plurality of blades arranged in the casing acting to shift the fertilizer as the casing rotates, and a plurality of stirring fingers for breaking up and finely dividing the fertilizer as the casing rotates, said fingers being arranged in groups substantially in line with said blades circumferentially.

2. In a mixer of the character described, a casing, means for rotating the casing, a plurality of stirring members arranged in said casing, each of said stirring members comprising a supporting plate and a plurality of stirring elements rigidly secured to said plate, each of said elements being formed with a plurality of comparatively long fingers arranged in a group, said group being arranged at an angle to the direction of rotation of the casing.

3. In a mixer of the character described, a casing, means for operating the casing, a plurality of stirring members arranged in said casing, each of said stirring members comprising a supporting plate secured to the casing, and a plurality of stirring elements rigidly secured to each plate, certain of said elements being formed with a plurality of comparatively long sharp fingers arranged in a group.

GEORGE W. BISHOP, Jr.